(12) United States Patent
Ito

(10) Patent No.: US 9,979,330 B2
(45) Date of Patent: May 22, 2018

(54) THREE-PHASE MOTOR CONTROL APPARATUS

(71) Applicant: KABUSHIKI KAISHA TOSHIBA, Tokyo (JP)

(72) Inventor: Tamotsu Ito, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/253,881

(22) Filed: Sep. 1, 2016

(65) Prior Publication Data

US 2017/0207736 A1 Jul. 20, 2017

(30) Foreign Application Priority Data

Jan. 15, 2016 (JP) ................................. 2016-006158

(51) Int. Cl.
*H02P 6/14* (2016.01)
*H02P 27/06* (2006.01)

(52) U.S. Cl.
CPC ............... *H02P 6/14* (2013.01); *H02P 27/06* (2013.01)

(58) Field of Classification Search
CPC .... H02P 6/14; H02P 8/34; H02P 27/08; H02P 7/00; G01R 1/00; G01R 15/00
See application file for complete search history.

(56) References Cited

U.S. PATENT DOCUMENTS

| 4,651,076 A * | 3/1987 | Oltendorf ................. H02P 8/14 318/685 |
| 6,680,593 B2 * | 1/2004 | Gotou ..................... G11B 19/28 318/400.04 |
| 7,119,508 B2 | 10/2006 | Kurosawa et al. | |
| 7,187,147 B2 * | 3/2007 | Yokouchi .......... H02M 7/53875 318/432 |
| 2014/0159626 A1 | 6/2014 | Lee | |
| 2016/0094167 A1 * | 3/2016 | Kim ....................... H02P 6/182 318/400.09 |

FOREIGN PATENT DOCUMENTS

| JP | 2004-297904 A | 10/2004 |
| JP | 2005102482 A | 4/2005 |
| JP | 2014121082 A | 6/2014 |

* cited by examiner

*Primary Examiner* — Eduardo Colon Santana
*Assistant Examiner* — Said Bouziane
(74) *Attorney, Agent, or Firm* — Patterson & Sheridan, LLP

(57) ABSTRACT

A three-phase motor control apparatus includes a monitor unit, a three-phase synthesis unit, and a feedback unit. The monitor unit generates monitor voltages derived from output voltages of output transistors having terminals electrically connected to drive coils of respective phases of a three-phase motor. The three-phase synthesis unit converts the monitor voltages into currents and generates a combined current therefrom. The feedback unit generates a feedback signal based on the combined current and feeds the feedback signal back to an output controller that generate control signals for the output transistors based on the feedback signal.

12 Claims, 5 Drawing Sheets

THREE-PHASE MOTOR CONTROL APPARATUS

CROSS-REFERENCE TO RELATED APPLICATION

This application is based upon and claims the benefit of priority from. Japanese Patent Application No. 2016-006158, filed Jan. 15, 2016, the entire contents of which are incorporated herein by reference.

FIELD

Embodiments described herein relate generally to a three-phase motor control apparatus.

BACKGROUND

In a three-phase motor control apparatus, a shunt resistor is connected to an output transistor which drives a coil of each phase, a current flowing in the shunt resistor is converted into a voltage, and the level of a current flowing in the coil of each phase is controlled by comparing the converted voltage and a reference voltage.

Since a current flows in coils of two or more phases at the same time in a 180° conduction type three-phase motor, a high current resulting from combining currents flowing in the coils of the respective phases flows in the shunt resistor, and an amount of heat generated in the shunt resistor increases. Therefore, the related-art IC chip having an output transistor formed therein does not have a shunt resistor mounted therein, and the shunt resistor is mounted outside of the IC chip. As a result, there is a problem that the cost of the three-phase motor control apparatus increases.

DETAILED DESCRIPTION

Figure 1:
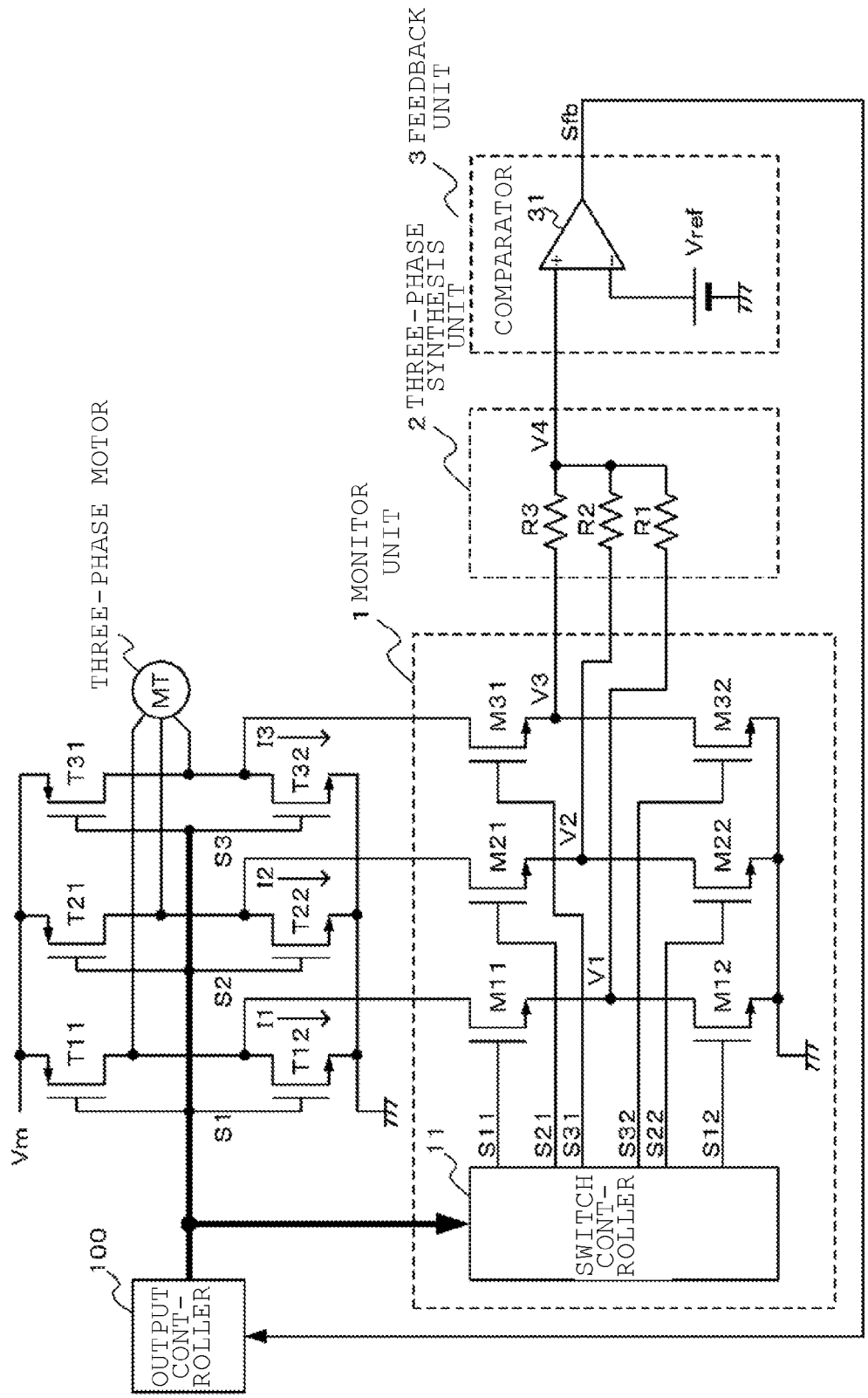
FIG. 1 is a block diagram illustrating an example of a configuration of a three-phase motor control apparatus according to a first embodiment.

Embodiments provide a three-phase motor control apparatus which can detect a synthetic current of currents flowing in coils of respective phases without using a shunt resistor.

In general, according to one embodiment, a three-phase motor control apparatus includes a monitor unit, a three-phase synthesis unit, and a feedback unit. The monitor unit generates monitor voltages derived from output voltages of output transistors having terminals electrically connected to drive coils of respective phases of a three-phase motor. The three-phase synthesis unit converts the monitor voltages into currents and generates a combined current therefrom. The feedback unit generates a feedback signal based on the combined current and feeds the feedback signal back to an output controller that generate control signals for the output transistors based on the feedback signal.

Hereinafter, embodiments are described with reference to the drawings. In the drawings, the same signs are attached to the substantially same or corresponding components, and the description thereof is omitted.

First Embodiment

FIG. 1 is a block diagram illustrating an example of a configuration of a three-phase motor control apparatus of a first embodiment.

The three-phase motor control apparatus of this embodiment includes: a monitor unit 1 which generates monitor voltages V1, V2, and V3 in accordance with output voltages of output transistors T11 and T12, T21 and T22, and T31 and T32, which drive coils of respective phases of a three-phase motor MT; a three-phase synthesis unit 2 which converts the monitor voltages V1, V2, and V3 into currents, and generates a combined current thereof; and a feedback unit 3 which generates a feedback signal Sfb based on the combined current, and feeds the feedback signal Sfb back to an output controller 100, which controls the conduction of the output transistors T11-T32.

The monitor unit 1 includes an MOS transistor M11 and an MOS transistor M12 which are connected between a ground terminal and drain terminals of the output transistors T11 and T12 in series and generates the monitor voltage V1 from a connection node thereof, an MOS transistor M21 and an MOS transistor M22 which are connected between a ground terminal and drain terminals of the output transistors T21 and T22 in series and generates the monitor voltage V2 from a connection node thereof, an MOS transistor M31 and an MOS transistor M32 which are connected between a ground terminal and a drain terminals of the output transistors T31 and T32 in series and generates the monitor voltage V3 from a connection node thereof, and a switch controller 11 which controls the conduction of the MOS transistors M11-M32.

The switch controller 11 generates switch control signals S11 to S32 to control the conduction of the MOS transistors M11 to M32 based on signals S1 to S3 for controlling the conduction of the output transistors T11 to T32, the signals S1 to S3 being sent to the switch controller 11 by the output controller 100. A correspondence relationship between the signals S1 to S3 and the switch control signals S11 to S32 is described in detail below.

The three-phase synthesis unit 2 has resistors R1, R2, and R3 which are connected between output terminals of the monitor voltages V1, V2, and V3 of the monitor unit 1 and a common output terminal.

The resistors R1, R2, and R3 convert the monitor voltages V1, V2, and V3 into currents, respectively. The converted currents are composed at the common output terminal and become a combined current. The voltage of the common output terminal is a combined voltage V4 which is obtained by converting the combined current into a voltage.

The resistors R1, R2, and R3 are formed in an IC chip using polysilicon, for example.

The feedback unit 3 has a comparator 31 which compares the combined voltage V4 of the output terminal of the three-phase synthesis unit 2 and a reference voltage Vref, and makes an output signal of the comparator 31 to be the feedback signal Sfb.

Figure 2:
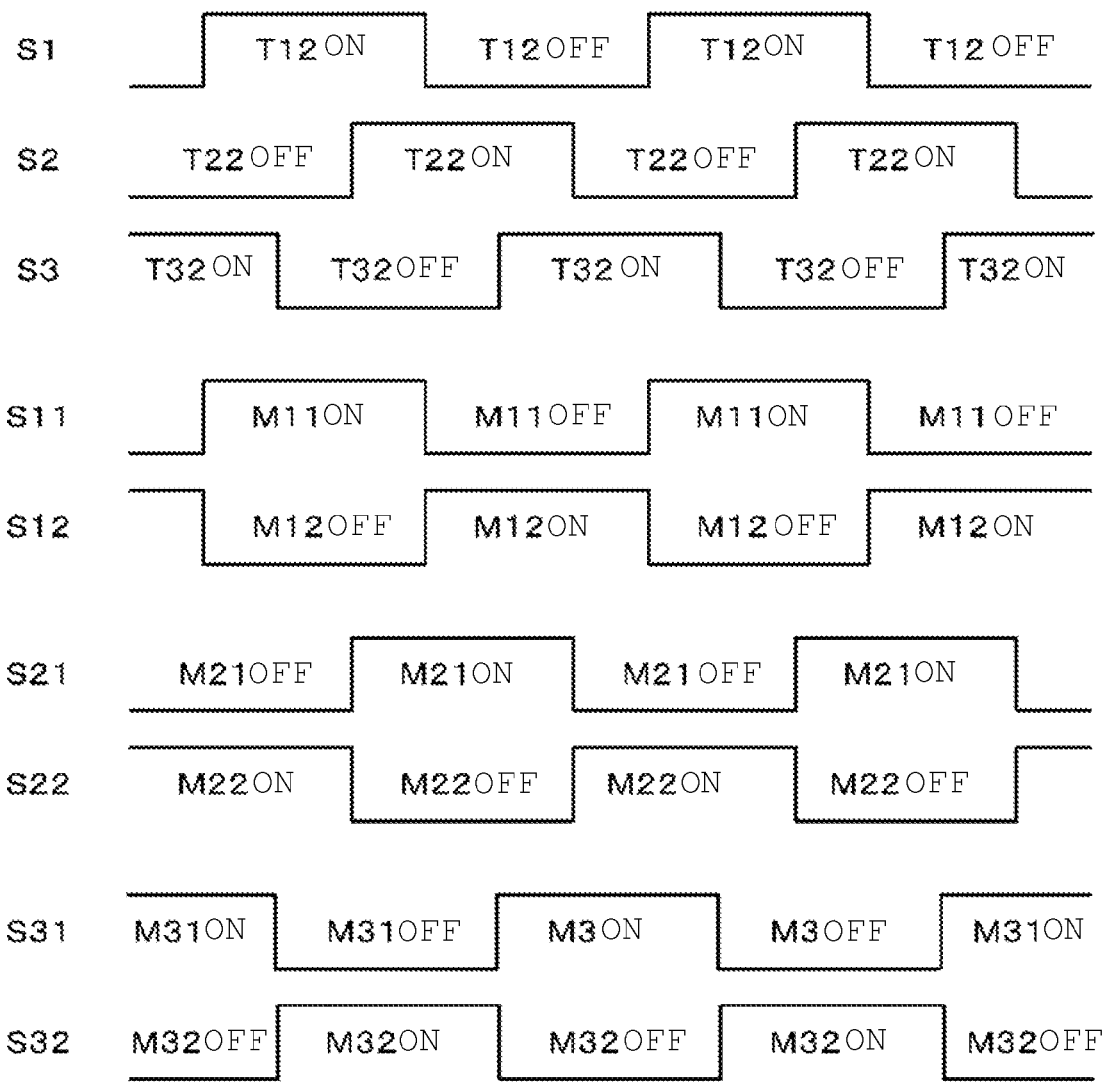
FIG. 2 is a waveform view illustrating an example of an output signal of a switch controller.

FIG. 2 illustrates the relationship between the signals S1 to S3 for controlling the conduction of the output transistors T11 to T32, and the switch control signals S11 to S32 generated in the switch controller 11.

The switch control signal S11 has the same phase as the signal S1, and the switch control signal S12 has a reversed phase compared to the signal S1.

The switch control signal S21 has the same phase as the signal S2, and the switch control signal S22 has a reversed phase compared to the signal S2.

The switch control signal S31 has the same phase as the signal S3, and the switch control signal S32 has a reserve phase compared to the signal S3.

The switch controller 11 generates the switch control signals S11 to S32, such that the MOS transistors M11, M21, and M31 of the monitor unit 1 are turned on when the output transistors T12, T22, and T32 are turned on, and the MOS transistors M12, M22, and M32 of the monitor unit 1 are turned on when the output transistors T12, T22, and T32 are turned off.

Accordingly, if currents flowing in the respective transistors when the output transistors T12, T22, and T32 are turned on are expressed by I1, I2, and I3, and on resistances of the output transistors T12, T22, and T32 are expressed by Ron1, Ron2, and Ron3, the monitor voltages V1, V2, and V3 output from the monitor unit 1 are expressed as follows, according to the on/off state of the output transistors T12, T22, and T32.

When the output transistor T12 is turned on, V1=I1×Ron1; when the output transistor T12 is turned off, V1=0; when the output transistor T22 is turned on, V2=I2×Ron2; when the output transistor T22 is turned off, V2=0; when the output transistor T32 is turned on, V3=I3×Ron3; and when the output transistor T32 is turned off, V3=0. That is, when the output transistors T12, T22, and T32 are turned on, voltages corresponding to the output voltages (I1×Ron1, I2×Ron2, and I3×Ron3) of the output transistors T12, T22, and T32 are output as the monitor voltages V1, V2, and V3.

The three-phase synthesis unit 2 converts the monitor voltages V1, V2, and V3 into currents by the resistors R1, R2, and R3, respectively. Herein, if the resistance values of the resistors R1, R2, and R3 are expressed by R1, R2, and R3, and the voltage of the common output terminal of the resistors R1, R2, and R3 is expressed by V4, a current flowing into the common output terminal and a current flowing from the common output terminal are the same, and thus the following equation is established.

$(V1-V4)/R1+(V2-V4)/R2+(V3-V4)/R3=0$. Therefore, if the resistance values of the resistors R1, R2, and R3 are the same value (R1=R2=R3), the combined voltage which is obtained by converting a combined current of three phases into a voltage equals $V4=(V1+V2+V3)/3$.

The comparator 31 of the feedback unit 3 compares the combined voltage V4 and the reference voltage Vref. The comparator 31 outputs "0" as the feedback signal Sfb when V4<Vref, and outputs "1" as the feedback signal Sfb when V4≥Vref.

The output controller 100 receives the feedback of the feedback signal Sfb, and controls the conduction of the output transistors T11 to T32 such that the maximum value of the output currents of the output transistors T11 to T32 falls within a normal value.

According to this embodiment, a combined current of currents flowing in coils of respective phases can be detected without using a shunt resistor. Furthermore, a feedback signal for controlling the maximum value of the output currents of the output transistors may be generated by converting the combined current into a combined voltage and comparing the combined voltage and a reference voltage.

Second Embodiment

Figure 3:
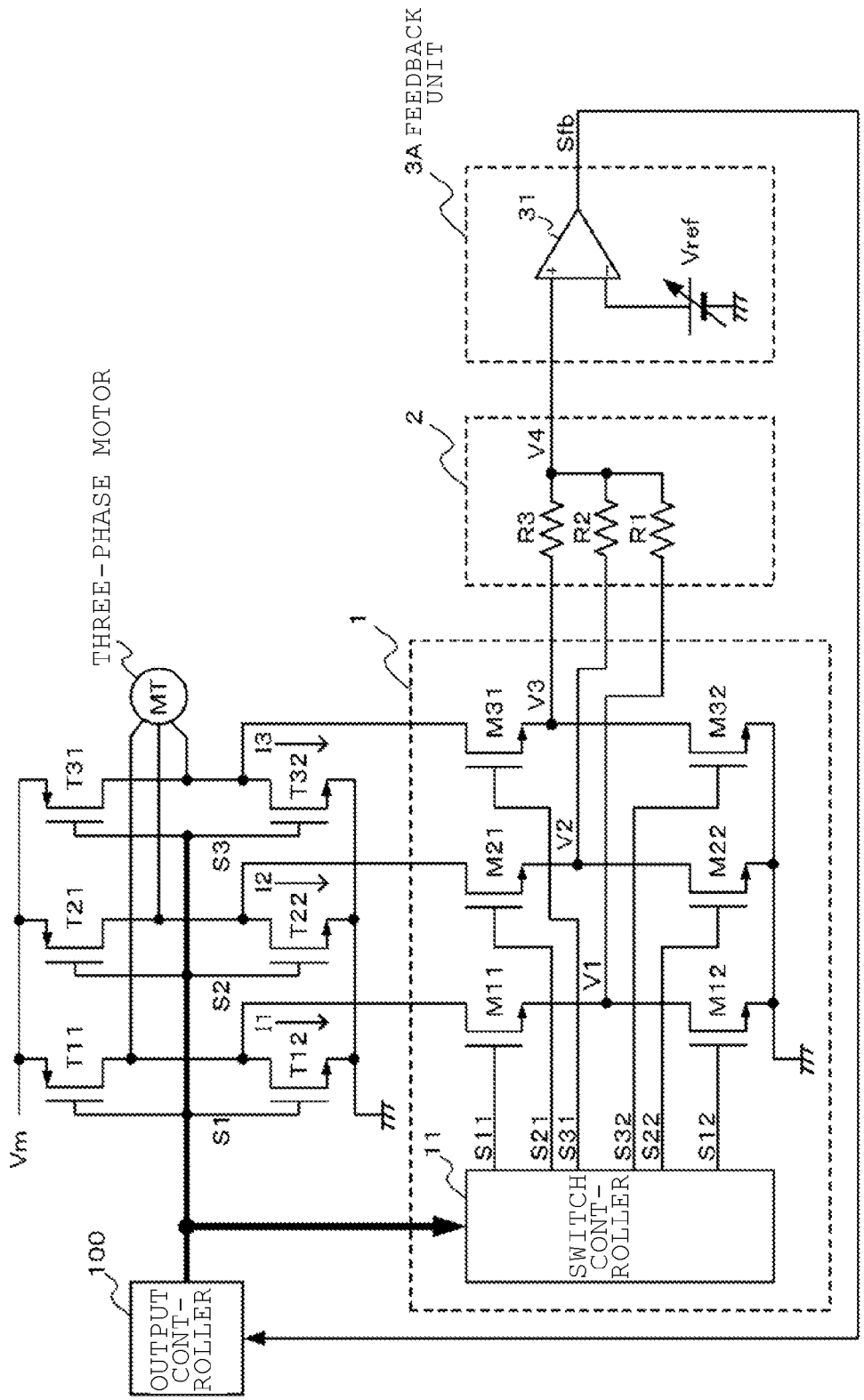
FIG. 3 is a block diagram illustrating an example of a configuration of a three-phase motor control apparatus according to a second embodiment.

FIG. 3 is a block diagram illustrating an example of a configuration of a three-phase motor control apparatus according to a second embodiment.

The three-phase motor control apparatus of this embodiment differs from that of the first embodiment in that a voltage value of a reference voltage Vref which is input to a comparator 31 of a feedback unit 3A is variable.

By changing the voltage value of the reference value Vref, feedback control may be performed with respect to the output controller 100 to make the output currents of the output transistors T11 to T32 into constant currents.

That is, according to this embodiment, a constant current control may be performed with respect to the output currents of the output transistors T11 to T32.

Third Embodiment

Figure 4:
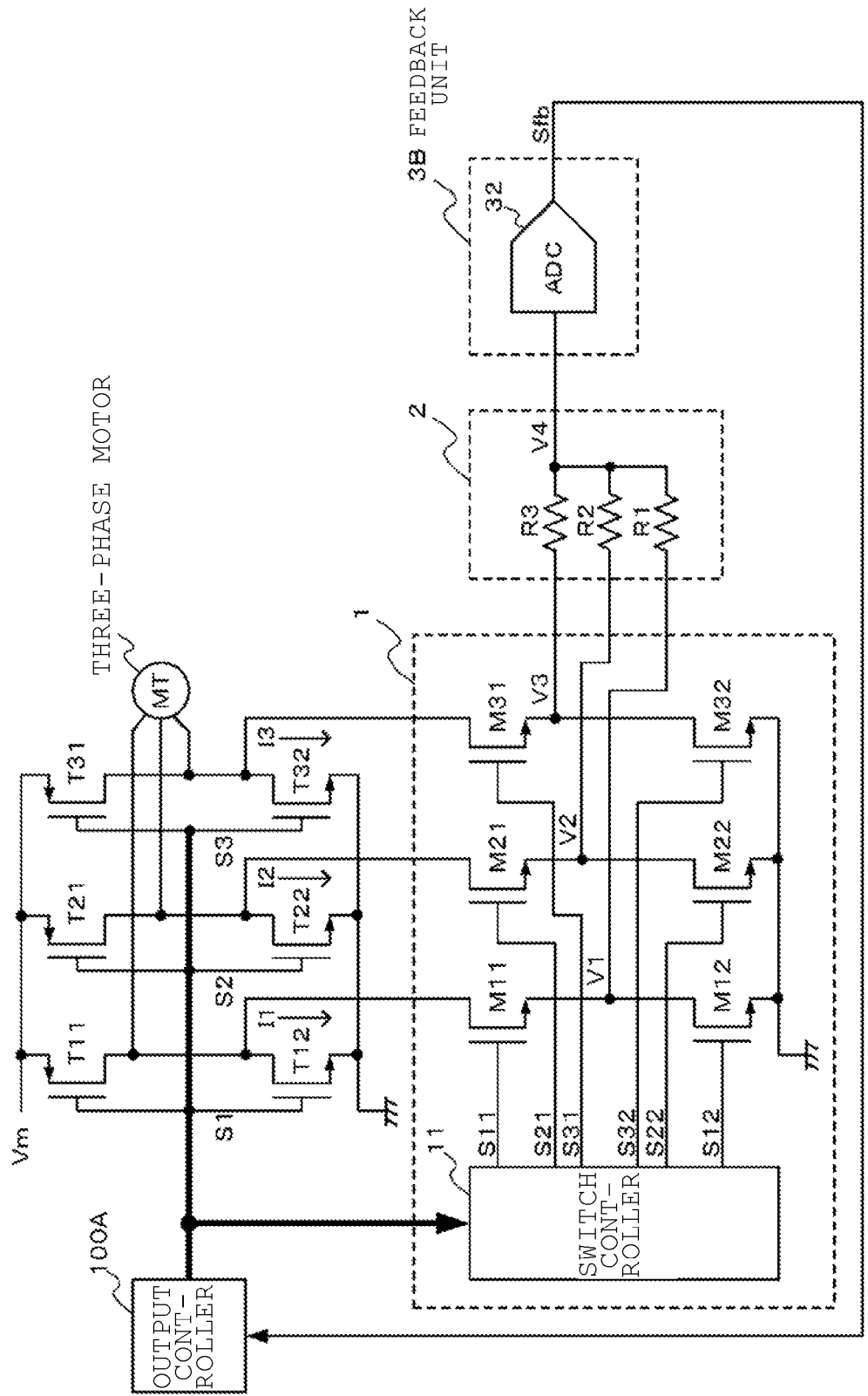
FIG. 4 is a block diagram illustrating an example of a configuration of a three-phase motor control apparatus according to a third embodiment.

FIG. 4 is a block diagram illustrating an example of a configuration of a three-phase motor control apparatus according to a third embodiment.

In the three-phase motor control apparatus of this embodiment, a feedback unit 3B has an AD converter 32 which converts a combined voltage V4 output from a three-phase synthesis unit 2 into a digital value.

The AD converter 32 feeds a value which AD-converts the combined voltage V4 back to an output controller 100A as a feedback signal Sfb.

The output controller 100A controls the levels of the output currents of the output transistors T11 to T32 according to the value of the AD-converted combined voltage V4 as compared against a reference voltage.

According to this embodiment, since the AD-converted combined voltage V4 is fed back to the output controller 100A, the levels of the output currents of the output transistors T11 to T32 can be precisely controlled.

Fourth Embodiment

Figure 5:
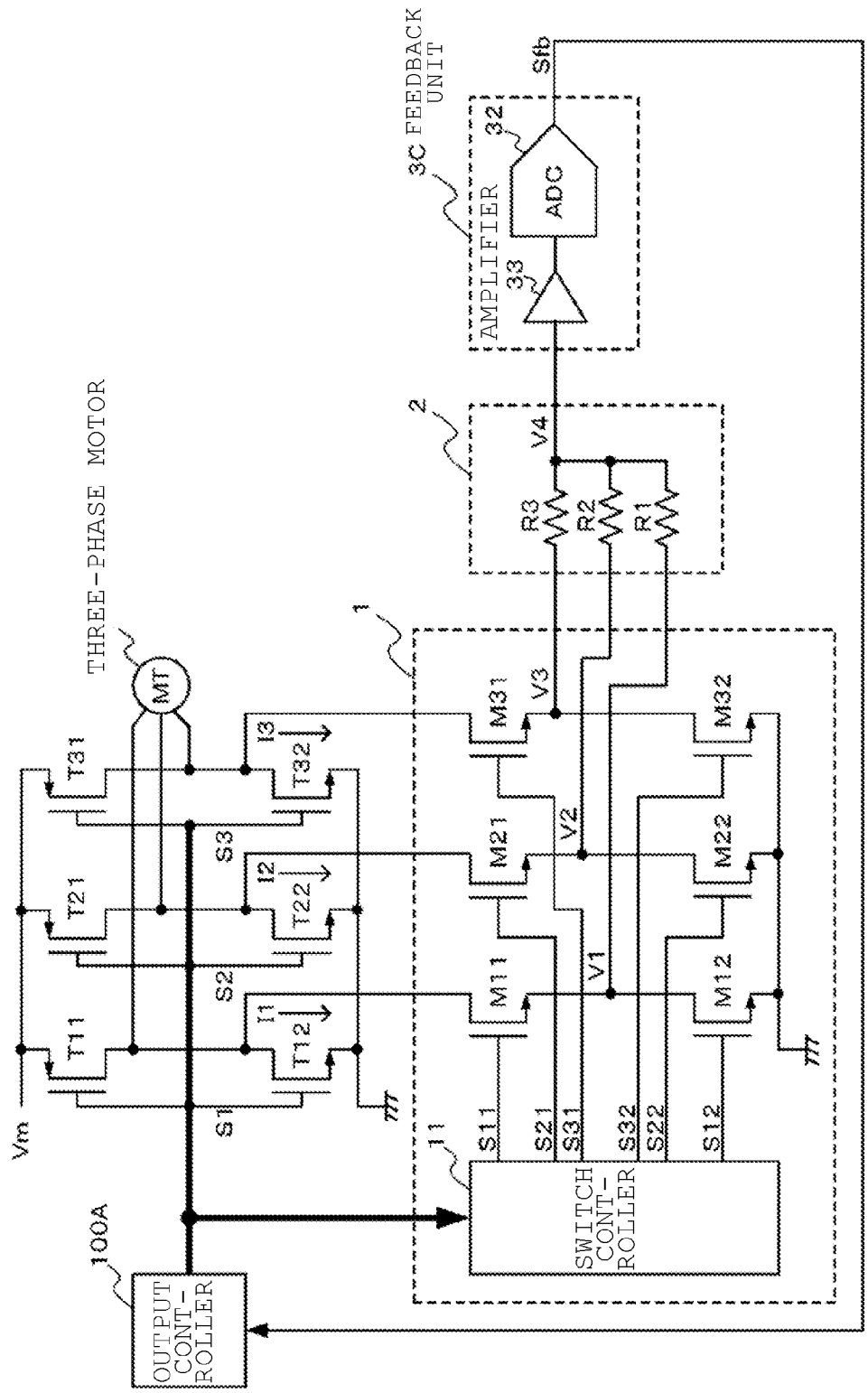
FIG. 5 is a block diagram illustrating an example of a configuration of a three-phase motor control apparatus according to a fourth embodiment.

FIG. 5 is a block diagram illustrating an example of a configuration of a three-phase motor control apparatus according to a fourth embodiment.

The three-phase motor control apparatus of this embodiment differs from the third embodiment in that a feedback unit 3C has an amplifier 33 to amplify the combined voltage V4 output from a three-phase synthesis unit 2, and an output of the amplifier 33 is input to an AD converter 32.

According to this embodiment, since the combined voltage V4 is amplified by the amplifier 33, an input sensitivity of the AD converter 32 is increased.

According to the three-phase motor control apparatus of at least one embodiment described above, a combined current of currents flowing in coils of respective phases can be detected without using a shunt resistor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-phase motor control apparatus comprising:
a monitor unit that generates monitor voltages derived from output voltages of output transistors having terminals electrically connected to drive coils of respective phases of a three-phase motor;
a three-phase synthesis unit that converts the monitor voltages into currents and generates a combined current therefrom; and
a feedback unit that generates a feedback signal based on the combined current and feeds the feedback signal back to an output controller that generates control signals for the output transistors based on the feedback signal, wherein
the monitor unit includes:
three sets of first and second MOS transistors, first and second MOS transistors of each set connected to each other in series between the drain terminals of the output transistors and a ground terminal, the first and second MOS transistors of each set generating one of the monitor voltages at an output node therebetween; and
a switch controller that controls each of the first and second MOS transistors, the switch controller controlling the first MOS transistors with signals having a same phase as the control signals for the output transistors, and controlling the second MOS transistors with signals having a reverse phase to the control signals for the output transistors.

2. The three-phase motor control apparatus according to claim 1, wherein the three-phase synthesis unit has three resistors, each of which is connected between one of the output nodes of the monitor unit and an output terminal of the three-phase synthesis unit.

3. The three-phase motor control apparatus according to claim 1, wherein the feedback unit includes a comparator that compares a combined voltage corresponding to the combined current, and a reference voltage, the feedback signal being an output signal of the comparator.

4. The three-phase motor control apparatus according to claim 3, wherein the reference voltage in the feedback unit is a variable reference voltage.

5. The three-phase motor control apparatus according to claim 1, wherein the feedback unit includes an AD converter that converts the combined voltage into a digital value, which is fed back as the feedback signal.

6. The three-phase motor control apparatus according to claim 1, wherein the feedback unit includes an amplifier that amplifies the combined voltage, and an AD converter configured to convert the amplified combined voltage into a digital value which is fed back as the feedback signal.

7. A three-phase motor control apparatus comprising:
a monitor unit configured to generate monitor voltages derived from output voltages of output transistors having terminals electrically connected to drive coils of respective phases of a three-phase motor;
a three-phase synthesis unit configured to convert the monitor voltages into currents and generate a combined current therefrom;
a feedback unit configured to generate a feedback signal based on the combined current; and
an output controller configured to receive the feedback signal and generate control signals for the output transistors based on the feedback signal, wherein
the monitor unit includes:
three sets of first and second MOS transistors, first and second MOS transistors of each set connected to each other in series between the drain terminals of the output transistors and a ground terminal, the first and second MOS transistors of each set generating one of the monitor voltages at an output node therebetween; and
a switch controller configured to control each of the first and second MOS transistors, the switch controller controlling the first MOS transistors with signals having a same phase as the control signals for the output transistors, and controlling the second MOS transistors with signals having a reverse phase to the control signals for the output transistors.

8. The three-phase motor control apparatus according to claim 7, wherein the three-phase synthesis unit has three resistors, each of which is connected between one of the output nodes of the monitor unit and an output terminal of the three-phase synthesis unit.

9. The three-phase motor control apparatus according to claim 7, wherein the feedback unit includes a comparator that compares a combined voltage corresponding to the combined current, and a reference voltage, the feedback signal being an output signal of the comparator.

10. The three-phase motor control apparatus according to claim 9, wherein the reference voltage in the feedback unit is a variable reference voltage.

11. The three-phase motor control apparatus according to claim 7, wherein the feedback unit includes an AD converter configured to convert the combined voltage into a digital value, which is fed back as the feedback signal.

12. The three-phase motor control apparatus according to claim 7, wherein the feedback unit includes an amplifier configured to amplify the combined voltage, and an AD converter configured to convert the amplified combined voltage into a digital value which is fed back as the feedback signal.

* * * * *